ated Sept. 20, 1966

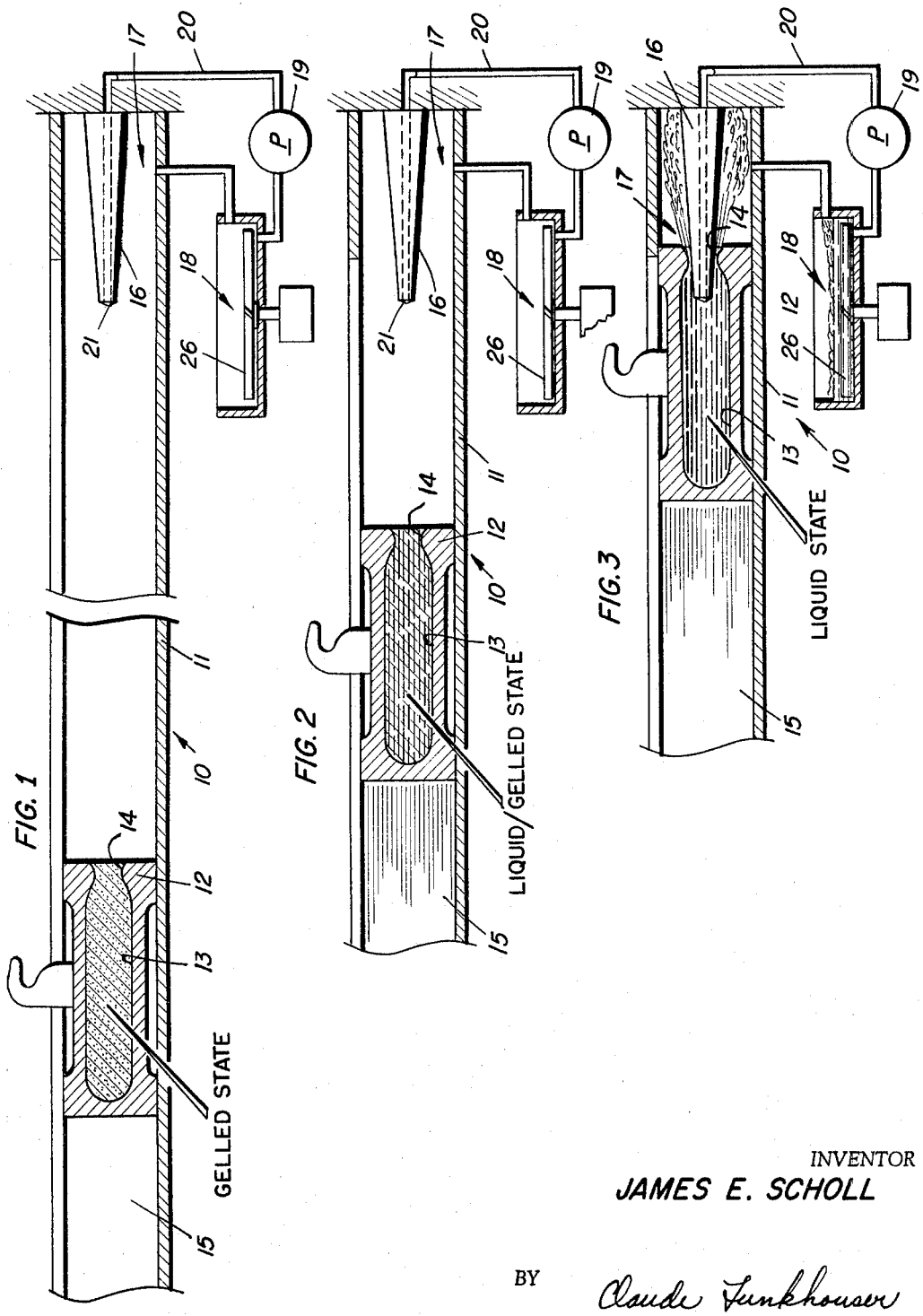

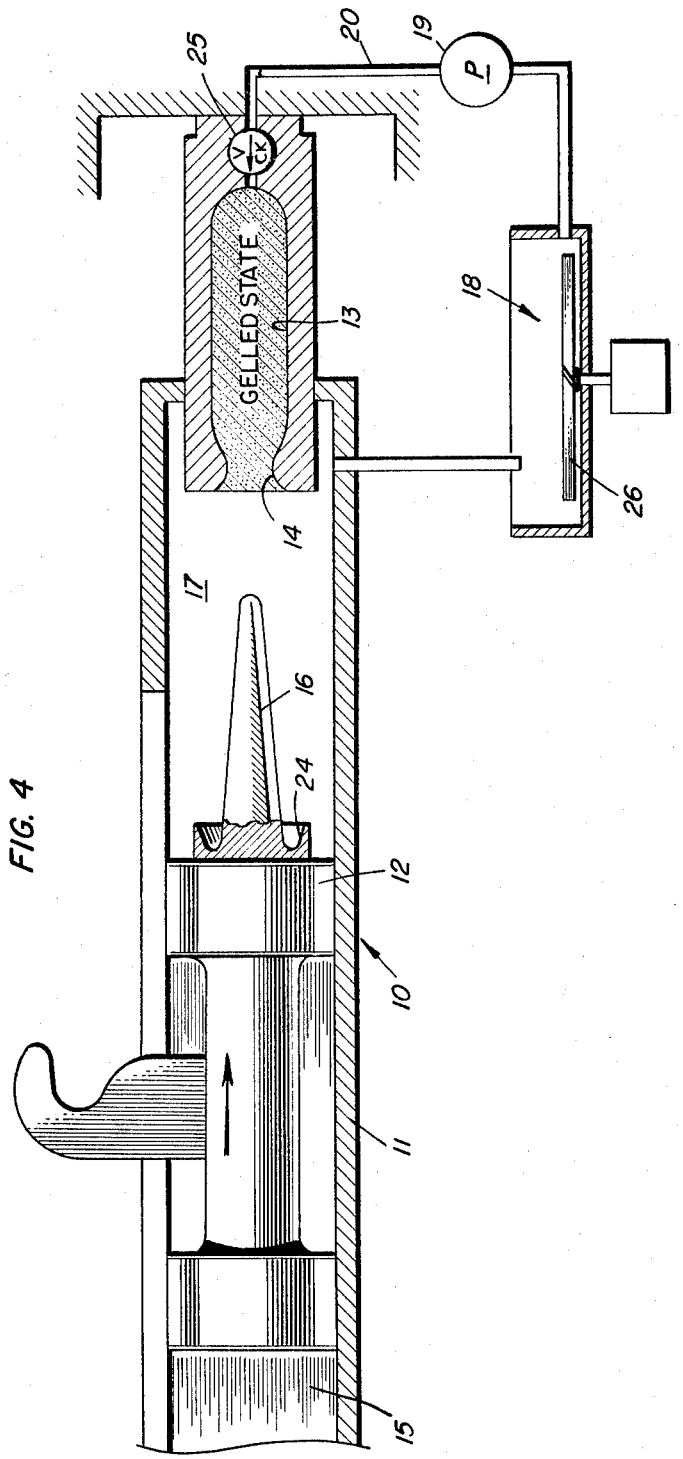

United States Patent Office 3,273,830
Patented Sept. 20, 1966

3,273,830
THIXOTROPES AS BRAKING MEDIUM FOR CATAPULT BRAKE
James E. Scholl, Fairfax, Va., assignor to the United States of America as represented by the Secretary of the Navy
Filed Mar. 31, 1965, Ser. No. 444,477
8 Claims. (Cl. 244—63)

The invention described herein may be manufactured and used by or for the Government of the United States of America for governmental purposes without the payment of any royalties thereon or therefor.

The present invention relates generally to catapults and more specifically to catapult braking apparatus.

In the use of catapults, especially the high pressure type used in aircraft launching, it is necessary to provide means for braking the catapult piston at the end of its travel. The earliest methods for doing so included spring means, rubber or sponge pad means, and wedging means. The disadvantages of these positive mechanical means are obvious. The modern concept is to use some kind of liquid to absorb the energy still present in the catapult piston at the end of its stroke. The most common embodiment of this type of braking means is a spear positioned at the end of the catapult cylinder, this spear functions through an opening in the forward face of the catapult piston to engage a reservoir of liquid, usually water. As the spear enters the opening it displaces water, forcing it out of the reservoir, around the spear, and thus evenly absorbs the energy still left in the system. However, disadvantages in the use of water in these systems have been encountered. It is difficult to fill the horizontal reservoir in the catapult piston with water without entrapping or entraining air bubbles therein. If air bubbles are present in the water when the spear engages the water filled reservoir, the result is a pulsating effect as the air is compressed or forced out through the piston opening and the entire catapult system is subjected to damaging vibration. Also, the enmixed air and water, when forced to broom out at high pressure in a fine spray through the piston opening causes extensive damage to the spear and to the auxiliary catapult equipment housed in the cylinder. Additionally, since the horizontal reservoir can be only partially filled with water, acceleration of the piston causes all the water to move rearward and the center of gravity of the moving piston is substantially changed, resulting in increased and uneven wear on the piston guides. The use of a thixotropic material in lieu of water offers advantages in all the above areas. A thixotropic material is a gel which liquifies when subjected to the action of vibratory forces such as ultrasonic waves or even simple shaking and then sets again on standing. Gels of this type may be formed by the addition of small quantities of electrolyte to concentrated sols of certain metallic oxides such as theric oxide, aluminum trioxide, zirconium dioxide and other sols including those of the benzenite clays and certain gelatin preparations. The thixotropic material, when placed in the piston reservoir, since it is in a gelled state, fills the reservoir entirely, leaving no air gaps. The vibrating movement of the piston through the catapult cylinder upon firing is sufficient to cause the thixotrope to liquify and it is in the liquid state when it is contacted by the spear at the end of the stroke. Since the thixotropic material is a gel when it fills the reservoir, there is no entrapped or entrained air to cause a change in the center of gravity of the piston as it is moved or to cause detrimental effects upon brooming at the end of the stroke.

It is an object of the present invention to provide improved braking means for catapults.

It is a further object of the present invention to provide improved catapult braking means in which the braking medium is a thixotropic material.

Other objects, advantages and novel features of the present invention will become apparent from the following detailed description of the invention when considered in conjunction with the accompanying drawings wherein:

FIG. 1 is a diagrammatic view in cross-section of the apparatus embodying the invention with the piston thereof shown in the battery position;

FIG. 2 is a diagrammatic illustration similar to the showing of FIG. 1, with the piston thereof shown in the intermediate position of its travel;

FIG. 3 is a diagrammatic illustration showing an additional position similarly as FIG. 1 with the piston in the braking position; and FIG. 4 is a diagrammatic view in elevation of an alternative embodiment of the invention.

Referring now to FIGS. 1 through 3, a catapult system such as those commonly used to catapult modern aircraft is shown as 10. The catapult system consists of a cylinder 11 in which is mounted the catapult piston 12. To piston 12 is attached, by an appropriately designed means, the object which is to be catapulted. In conjunction with the attached means which would, of course, extend through the cylinder wall, it is necessary to use a following seal to preserve the gas-tight integrity of section 15 of the cylinder. Attachment means and complementary seals are well known in the art and form no part of the present invention. Piston 12 contains in its center a reservoir 13 which holds the braking medium. An opening 14 is provided in the forward face of piston 12. Piston 12 is forced to travel the length of the catapult cylinder by pressure built up by steam or other fluid in section 15 of the cylinder. A tapered plug-shaped spear 16 is mounted at the braking end of catapult cylinder 11. Spear 16 is so positioned on the end wall of the catapult cylinder as to be received through opening 14 in the piston and protrude into the interior thereof at the end of the piston stroke and thus contact the fluid in reservoir 13. In conjunction with piston stroking, a collector area 17 is formed adjacent the spear 16 which functions to collect the fluid that booms out by reason of the braking action. This fluid is then conveyed to a tank 18 by suitable piping connected thereto. Pumping means 19 and conduit 20 convey the collected fluid state braking medium from tank 18 to a nozzle 21 in the end of spear 16. Thus, with the piston at the end of the stroke and spear 16 protruding into reservoir 13, replenishment of the braking medium in the reservoir 13 can be accomplished by pumping it from tank 18 through nozzle 21 and back into reservoir 13 as the piston is withdrawn. Since the thixotropic material will liquify when subjected to vibration, it is advantageous to provide dithering thereof by an agitating means 26 in tank 18 to facilitate the pumping.

In FIG. 4, an alternative embodiment of the present invention is shown. In this embodiment the position of spear 16 and reservoir 13 are interchanged. Spear 16 is now placed on the forward end of piston 12 to contact the opening 14 in reservoir 13 which is now placed at the end of the cylinder. In this embodiment it is necessary to provide piston 16 with a reversing shield 24 to protect the seals on piston 12, and it is also necessary to provide a check valve 25 in the replenishment line 20 to braking medium reservoir 13 in order to preclude high pressure back-up of the braking medium through the pumping system.

In operation, and referring particularly to FIGS. 1 through 3, piston 12 is initially in the battery state as shown in FIG. 1. In this position, the thixotrope is in the gelled state in reservoir 13. By the introduction of a pressure fluid in section 15 of the catapult cylinder, piston 12 is forced to the right, as illustrated in the drawings. As the piston moves through the cylinder, the inherent vibration thereof causes the thixotrope to begin to change from a gelled to a liquid state; it being substantially in a liquid state by the time piston 12 reaches the braking phase of the catapult evolution as shown in FIG. 3. At the end of the catapult stroke spear 16 enters the reservoir 13 through the opening 14 and contacts the liquid state thixotrope. The thixotrope braking medium now brooms out between the spear and the walls of the opening in a fine spray and the excess energy in the piston is thereby absorbed. The braking medium ejected from the reservoir 13 is collected in section 17 of the catapult cylinder from whence it drains to a tank 18 and is pumped back through conduit 20 to nozzel 21. With piston 12 in the braking position and the braking phase over, it is necessary to replenish the thixotrope in reservoir 13. This is accomplished as aforesaid by pumping the collected liquid through a nozzle 21 in the end of the spear while slowly withdrawing piston 12, thus allowing the thixotrope to gel as it fills reservoir 13. Since the thixotropic material can alternate readily between a liquid and a gelled state, it is desirable to have an agitator system for the pumping cycle. The agitator system should be such that the thixotrope is kept in the desired state, for example, liquid state through most of the pumping system and a semi-gelled state at the moment of injection back into reservoir 13, so it can gel immediately upon being deposited, allowing the reservoir to be completely filled.

The aforestated principles of operation for the device as shown in FIGS. 1 through 3 apply also to that alternative shown in FIG. 4. The principal difference in the latter embodiment is that the thixotropic material in reservoir 13, having not been vibrated through the length of the movement of the catapult piston is still in the gelled state when contacted by the spear which is mounted on movable piston 12. In this situation the thixotropic material possesses properties such that it immediately changes to a liquid upon the contact by spear 16. The replenishment of thixotropic material in reservoir 13 in FIG. 4 is not, of course, accomplished through a passage provided in the tip of spear 16 but is effected through a separate piping system, as shown, the operation of which is substantially identical to that of FIGS. 1 through 3.

It is well known in the art that thixotropic materials may be tailored to satisfy the demands of a particular application by varying its transitional characteristics. The particular thixotrope used in the instant invention would be so tailored to a particular application to provide optimum performance of the system. It is readily apparent that these characteristics would have to be developed to satisfy the particular demand of that particular catapult system and the specific composition of such material forms no part of this invention.

Obviously many modifications and variations of the present invention are possible in the light of the above teachings. It is therefore to be understood that within the scope of the appended claims the invention may be practiced otherwise than as specifically described.

What is claimed is:
1. A catapult launcher comprising
 a cylinder;
 a piston which moves forward within said cylinder and which is actuated by the pressure produced within said cylinder by the introduction of pressure fluid therein, said piston being provided with means for moving a load positioned externally of said cylinder;
 a braking medium reservoir in said piston, said reservoir culminating in means defining a forwardly facing opening in said piston;
 a tapered spear fixedly mounted within said cylinder and adapted to engage said opening of said piston and therethrough said reservoir near the end of the piston stroke;
 a thixotropic material within and filling said reservoir, said thixotropic material being in the gelled state when the piston is at rest;
 whereby the action of said spear contacting said thixotropic material will brake the piston at the end of its stroke.

2. The structure as defined in claim 1 and further comprising
 means for collecting the thixotropic material displaced from said reservoir by the action of said spear; and
 means for conveying the thixotropic material displaced back to said reservoir.

3. The structure as defined in claim 2 wherein said conveying means comprises
 pumping means in communication with said collecting means; and
 a nozzle in said spear, said nozzle being in communication with said pumping means;
 whereby the collected thixotropic material may be pumped through said nozzle into said reservoir after the braking and while said spear is engaging said reservoir.

4. The structure as defined in claim 3 further including
 means within said conveying means for controlling the physical state of the collected thixotropic material;
 whereby the collected thixotropic material may be kept in the liquid state while being conveyed back to the reservoir.

5. In a catapult launched including a gas operated piston within a cylinder, the piston having internally a reservoir for braking medium, an opening in the forward end communicating with the reservoir, and a tapered spear fixedly mounted within the cylinder on the end wall thereof, such that the tapered spear will engage the opening in the piston during the terminal portion of the stroke thereof to coact with the braking medium to brake the piston, the improvement comprising a thixotropic material within the reservoir serving as the braking medium, said thixotropic material being in the gelled state when the piston is at rest and changing to the liquid state as the piston travels through the cylinder.

6. The structure as defined in claim 5 further comprising
 means for collecting the thixotropic material which is displaced from said reservoir by said spear; and
 means for conveying the thixotropic material so displaced back to said reservoir;

7. The structure as defined in claim 6 wherein said conveying means comprises
 pumping means in communication with said collecting means; and
 a nozzle in said spear, said nozzle being in communication with said pumping means;
 whereby the collected thixotropic material may be pumped through said nozzle into said reservoir after braking and while said spear is engaging said reservoir.

8. The structure as defined in claim 7 further including means within said conveying means for controlling the physical state of the collected thixotropic material;
 whereby the collected thixotropic material may be maintained in the liquid state while being conveyed back to said reservoir.

References Cited by the Examiner
UNITED STATES PATENTS 2,452,618   11/1948   Weeks _____ 244—63
2,734,702   2/1956    Northrop et al. _____ 244—63

MILTON BUCHLER, *Primary Examiner.*

L. C. HALL, *Assistant Examiner.*